(12) United States Patent
Fan et al.

(10) Patent No.: US 11,285,940 B2
(45) Date of Patent: Mar. 29, 2022

(54) DIAGONAL PARKING SPACE DETECTION METHOD, AND AUTOMATIC PARKING METHOD AND SYSTEM

(71) Applicant: Guangzhou Automobile Group Co., Ltd., Guangdong (CN)

(72) Inventors: Ming Fan, Guangdong (CN); Qiaojun He, Guangdong (CN); Qinggui Pan, Guangdong (CN); Hongshan Zha, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 16 days.

(21) Appl. No.: 16/338,704

(22) PCT Filed: Oct. 16, 2018

(86) PCT No.: PCT/CN2018/110539
§ 371 (c)(1),
(2) Date: Apr. 2, 2019

(87) PCT Pub. No.: WO2019/119944
PCT Pub. Date: Jun. 27, 2019

(65) Prior Publication Data
US 2021/0354687 A1    Nov. 18, 2021

(30) Foreign Application Priority Data
Dec. 20, 2017  (CN) .......................... 201711387637.0

(51) Int. Cl.
*B60W 30/06* (2006.01)
*G01S 15/08* (2006.01)
(Continued)

(52) U.S. Cl.
CPC ............. *B60W 30/06* (2013.01); *G01S 15/08* (2013.01); *G01S 15/931* (2013.01);
(Continued)

(58) Field of Classification Search
CPC .......................... B62D 15/0285; B62D 15/027; B62D 15/021; B60Q 1/48; B60W 10/20; G01S 2015/935; G01S 2015/936
See application file for complete search history.

(56) References Cited

U.S. PATENT DOCUMENTS

| 2010/0274446 | A1* | 10/2010 | Sasajima | G08G 1/165 |
| | | | | 701/36 |
| 2011/0087406 | A1* | 4/2011 | Barth | B60Q 1/48 |
| | | | | 701/41 |

(Continued)

FOREIGN PATENT DOCUMENTS

| CN | 1755331 A | 4/2006 |
| CN | 101878494 A | 11/2010 |

(Continued)

*Primary Examiner* — Mirza F Alam
(74) *Attorney, Agent, or Firm* — ScienBiziP, P.C.

(57) ABSTRACT

Provided are a diagonal parking space detection method and device, and an automatic parking method and system. The diagonal parking space detection method includes: operation S11, determining a target diagonal parking space in multiple diagonal parking spaces arranged along a reference line, wherein the target diagonal parking space is located between a first reference parking space and a second reference parking space; operation S12, detecting a first reference point identifying an intersection point between the first reference parking space and the reference line; operation S13, calculating a slope of the target diagonal parking space; operation S14, detecting a second reference point identifying an intersection point between the second reference parking space and the reference line; and operation S15, calculating a width of the target diagonal parking space.

19 Claims, 3 Drawing Sheets

(51) Int. Cl.
*G01S 15/931* (2020.01)
*G08G 1/14* (2006.01)
*G06V 20/58* (2022.01)

(52) U.S. Cl.
CPC ........... *G06V 20/586* (2022.01); *G08G 1/141* (2013.01); *G01S 2015/936* (2013.01)

(56) References Cited

U.S. PATENT DOCUMENTS

| | | | | |
|---|---|---|---|---|
| 2016/0078763 | A1* | 3/2016 | Kiyokawa | G06K 9/00812 382/104 |
| 2016/0159397 | A1* | 6/2016 | Baek | B62D 15/0285 701/41 |
| 2017/0137061 | A1* | 5/2017 | Azuma | B62D 15/021 |
| 2018/0345955 | A1* | 12/2018 | Kim | B60W 30/06 |

FOREIGN PATENT DOCUMENTS

| | | | |
|---|---|---|---|
| CN | 102034366 | A | 4/2011 |
| CN | 102066186 | A | 5/2011 |
| CN | 103723144 | A | 4/2014 |
| CN | 105528913 | A | 4/2016 |
| CN | 106043282 | A | 10/2016 |
| CN | 106541914 | A | 3/2017 |
| CN | 107491738 | A | 12/2017 |
| CN | 108254752 | A | 7/2018 |
| DE | 102016104574 | A1 | 9/2017 |
| JP | 2002228734 | A | 8/2002 |
| JP | 2013220802 | A | 10/2013 |

* cited by examiner

DIAGONAL PARKING SPACE DETECTION METHOD, AND AUTOMATIC PARKING METHOD AND SYSTEM

The present application claims priority to China Patent Application No. 201711387637.0, filed on Dec. 20, 2017 and entitled "Diagonal Parking Space Detection Method, and Automatic Parking Method and System", which is hereby incorporated by reference in its entirety.

TECHNICAL FIELD

The present disclosure relates to the technical field of vehicle electronics, and more particularly to a diagonal parking space detection method, and an automatic parking method and system.

BACKGROUND

At present, parallel parking and vertical parking are main researching focuses in the technical field of automatic parking. For diagonal parking spaces with uncertain angles, due to the limitation of a sensor ranging distance and the limitation of a fixed mounting position, the key information of the diagonal parking spaces with uncertain angles cannot be effectively detected, resulting in the situation that the existing automatic parking system cannot realize automatic parking in the diagonal parking spaces.

In a diagonal parking space detection solution based on an ultrasonic sensor and a stepping motor gear mechanism, the position of an ultrasonic sensor mounted on the side of a vehicle is not fixed, and the orientation position of an ultrasonic probe can be dynamically adjusted by a stepping motor, so that the width of the parking space can be detected by the position-adjustable ultrasonic wave. However, since the sensor in the solution needs to be mounted adopting an angle-rotatable mounting method, for the consideration of mass production of passenger cars, the sensor mounting solution has high cost and large influence on external shape and structural stability, and thus cannot be mass-produced.

Another automatic parking algorithm solves the problem that the bodies of the vehicles in front of or behind the parking space have a certain inclination angle during side parking. However, this solution is applicable to side parking, and the estimated inclination angle is only used to correct coordinates of a reference point, therefore the solution cannot be used to estimate a diagonal parking space.

SUMMARY

The technical problem to be solved by the present disclosure is to provide a diagonal parking space detection method and an automatic parking method and system, which realize the detection of the angle and width of a diagonal parking space with a variable angle.

In order to solve the above technical problem, an embodiment of the present disclosure provides a diagonal parking space detection method, which includes the operations as follows.

In operation S11, a target diagonal parking space is determined in multiple diagonal parking spaces arranged along a reference line, wherein the target diagonal parking space is located between a first reference parking space and a second reference parking space.

In operation S12, a first reference point identifying an intersection point between the first reference parking space and the reference line is detected.

In operation S13, a slope of the target diagonal parking space is calculated.

In operation S14, a second reference point identifying an intersection point between the second reference parking space and the reference line is detected.

In operation S15, a width of the target diagonal parking space is calculated according to the slope of the target diagonal parking space, a distance between the first reference point and the second reference point and a width of the first reference parking space.

The first reference parking space, the target diagonal parking space and the second reference parking space are arranged along the reference line in the same slope in an ascending order of their respective distance from a vehicle to be parked.

The first reference point is located on a first reference vehicle parked in the first reference parking space, and the second reference point is located on a second reference vehicle parked in the second reference parking space.

The operation S12 includes the operations as follows:

The vehicle to be parked is controlled to travel a set distance along the reference line toward the target diagonal parking space, and multiple sensor ranging values between the vehicle to be parked and multiple reflection points on the first reference vehicle are obtained.

It is judged whether a set of sensor ranging values within a set time period satisfies a set judgment condition, and in a case of judging that the set of sensor ranging values within the set time period satisfies the set judgment condition, a reflection point corresponding to a middle sensor ranging value in the set of sensor ranging values is taken as the first reference point.

The operation S14 includes the operations as follows.

The vehicle to be parked is controlled to travel a set distance along the reference line toward the target diagonal parking space, and multiple sensor ranging values between the vehicle to be parked and multiple reflection points on the second reference vehicle are obtained.

It is judged whether a set of sensor ranging values within a set time period satisfies a set judgment condition, and in a case of judging that the set of sensor ranging values within the set time period satisfies the set judgment condition, a reflection point corresponding to a middle sensor ranging value in the set of sensor ranging values is taken as the second reference point.

The operation of judging whether the set of sensor ranging values within the set time period satisfies the set judgment condition includes: judging whether the set of sensor ranging values simultaneously satisfies the following set judgment conditions:

calculating an average value of the set of sensor ranging values, and judging whether the average value is within a first threshold range;

calculating a difference between a maximum value and a minimum value in the set of sensor ranging values, and judging whether the difference is within a second threshold range;

calculating a third value reflecting symmetry of the set of sensor ranging values according to a following formula and judging whether the third value is within a third threshold range:

$$\sum_{i=0}^{m/2} (X_{m-i} - X_i) \times 2/m$$

where m is a subscript of the last sensor ranging value in the set of sensor ranging values, i is a variable ranging from 0 to m/2, and $X_{m-i}-X_i$ represents a difference between sensor ranging values symmetrically located on both sides of a midpoint, the middle sensor ranging value in the set of sensor ranging values being taken as the midpoint; and calculating a fourth value reflecting lower convexity of the set of sensor ranging values according to a following formula and judging whether the fourth value is within a fourth threshold range:

$$\sum_{i=0}^{m/3} X_{\frac{m}{3}+i} - \left( \sum_{i=0}^{\frac{m}{3}} X_i + \sum_{i=0}^{\frac{m}{3}} X_{2\times\frac{m}{3}+i} \right) / 2$$

where m is a subscript of the last sensor ranging value in the set of sensor ranging values, and i is a variable ranging from 0 to m/3.

The first threshold range is set to 0.5-2 meters, the second threshold range is set to 0.2-0.6 meters, and the third threshold range and the fourth threshold range are calibrated according to actual situations.

The operation S13 includes the operations as follows.

The vehicle to be parked is controlled to travel a set distance along the reference line toward the target diagonal parking space, and multiple sensor ranging values between the vehicle to be parked and the second reference vehicle are acquired.

The slope of the target diagonal parking space is estimated, by a least squares method according to a travelling distance of the vehicle to be parked and the plurality of sensor ranging value.

The slope of the target diagonal parking space is estimated according to a following formula:

$$K = \frac{1}{C} \sum_{k=1}^{n} (x_k - \bar{x})(y_k - \bar{y})$$

$$\text{where, } C = \sum_{k=1}^{n} (x_k - \bar{x})^2$$

K is the slope of the target diagonal parking space, $x_k$ represents the travelling distance of the vehicle to be parked, $y_k$ is a sensor ranging value between the vehicle to be parked and the second reference vehicle, $\bar{x}$ and $\bar{y}$ respectively represent average values of $x_k$ and $y_k$, and k is a variable ranging from 1 to n.

The operation S15 includes the operations as follows.

An included angle between the target diagonal parking space and the reference line is obtained according to the slope of the target diagonal parking space.

The width of the target diagonal parking space is obtained by subtracting the width of the first reference parking space from a product of the distance between the first reference point and the second reference point and a sine value of the included angle.

Another embodiment of the present disclosure provides an automatic parking method, which includes the operations as follows.

In operation S21, a target diagonal parking space is determined in multiple diagonal parking spaces arranged along a reference line, wherein the target diagonal parking space is located between a first reference parking space and a second reference parking space.

In operation S22, a first reference point identifying an intersection point between the first reference parking space and the reference line is detected.

In operation S23, a slope of the target diagonal parking space is calculated.

In operation S24, a second reference point identifying an intersection point between the second reference parking space and the reference line is detected.

In operation S25, a width of the target diagonal parking space is calculated according to the slope of the target diagonal parking space, a distance between the first reference point and the second reference point and a width of the first reference parking space.

In operation S26, the slope and width of the target diagonal parking space, and coordinates of the first reference point and the second reference point are output.

In operation S27, an automatic parking route is planned according to the slope and width of the target diagonal parking space, and the coordinates of the first reference point and the second reference point, and automatic parking is performed according to the automatic parking route.

Still another embodiment of the present disclosure provides an automatic parking system, which includes:

a diagonal parking space detection device including:

a determination unit, configured to determine a target diagonal parking space in multiple diagonal parking spaces arranged along a reference line, wherein the target diagonal parking space is located between a first reference parking space and a second reference parking space;

a detection unit, configured to detect a first reference point identifying an intersection point between the first reference parking space and the reference line and detect a second reference point identifying, an intersection point between the second reference parking space and the reference line;

a calculation unit, configured to calculate a slope of the target diagonal parking space and calculate a width of the target diagonal parking space according to the slope of the target diagonal parking space, a distance between the first reference point and the second reference point and a width of the first reference parking space; and an automatic parking control device, configured to plan an automatic parking route according to the slope and width of the target diagonal parking space, and the coordinates of the first reference point and the second reference point, and perform automatic parking according to the automatic parking route.

The embodiments of the present disclosure have the following beneficial effects: on the premise of a fixed mounting position of ultrasonic sensors, a variable-angle diagonal parking space satisfying a parking condition can be automatically searched. Therefore, the defect in the related art that an existing automatic parking system can only carry out automatic parking on parallel parking spaces and vertical parking spaces is overcome. The functionality and application scenarios of automatic parking products are enriched, which is conducive to the acceleration of the automatic parking products for diagonal parking spaces.

BRIEF DESCRIPTION OF THE DRAWINGS

In order to more clearly illustrate the embodiments of the present disclosure or the technical solutions in the conventional art, the drawings used in the description of the embodiments or the conventional art will be briefly described below. It is apparent that the drawings in the following description are only some embodiments of the present disclosure, and other drawings can be obtained from those skilled in the art according to these drawings without any creative work.

DETAILED DESCRIPTION OF THE EMBODIMENTS

The following description of various embodiments is provided to illustrate implementable specific embodiments of the present disclosure with reference to the drawings.

Figure 1:
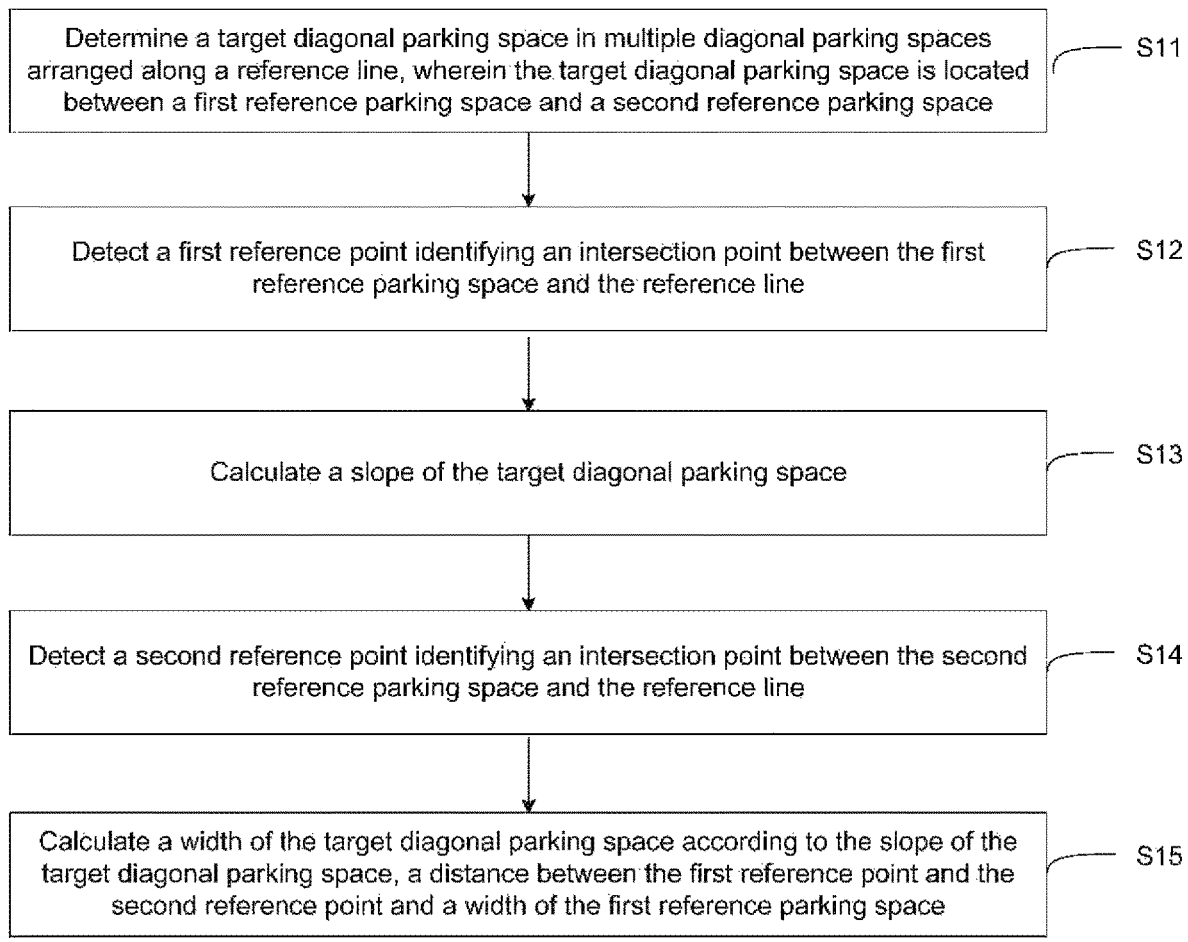
FIG. 1 is a flowchart of a diagonal parking space detection method according to Embodiment 1 of the present disclosure.

Referring to FIG. 1, a first embodiment of the present disclosure provides a diagonal parking space detection method, which includes the operations as follows.

In operation S1, a target diagonal parking space is determined in multiple diagonal parking spaces arranged along a reference line, wherein the target diagonal parking space is located between a first reference parking space and a second reference parking space.

In operation S2, a first reference point identifying an intersection point between the first reference parking space and the reference line is detected.

In operation S3, a slope of the target diagonal parking space is calculated.

In operation S4, a second reference point identifying an intersection point between the second reference parking space and the reference line is detected.

In operation S5, a width of the target diagonal parking space is calculated according to the slope of the target diagonal parking space, a distance between the first reference point and the second reference point and a width of the first reference parking space.

Figure 2:
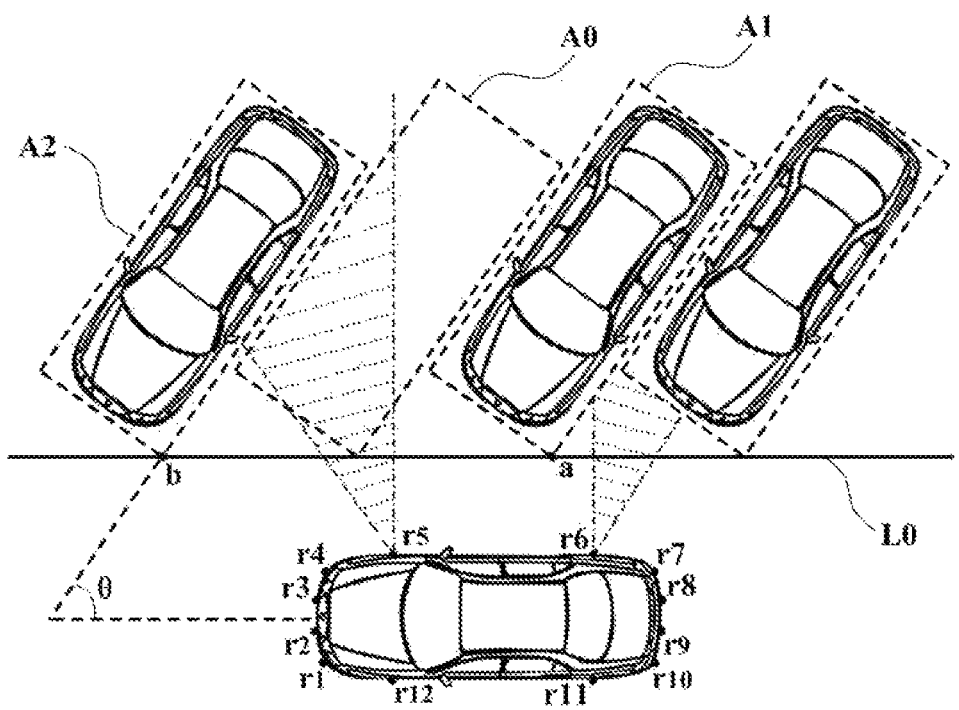
FIG. 2 is a schematic diagram of searching for a diagonal parking space ultrasonically according to Embodiment 1 of the present disclosure.

Please refer to FIG. 2, in the present exemplary embodiment, a total of 12 ultrasonic sensors are mounted in a vehicle to be parked. Four general distance sensors are mounted on the front side and the rear side of the vehicle, and two long distance sensors are mounted on the left and right sides of the vehicle respectively. The detection direction of the side front sensor is inclined at a certain angle toward the front of the vehicle, the detection direction of the side rear sensor is inclined at a certain angle toward the rear of the vehicle, and the mounting height is preferably 50 centimeters. In FIG. 2, r5, r6, r11, and r12 are long-distance sensors, the ranging is suggested to be above 4.5 meters, and a beam angle is preferably about 60 degrees. The horizontal front inclination angle of the side front sensor should satisfy a 1/2×horizontal beam angle, and the horizontal rear inclination angle of the side rear sensor should satisfy the 1/2×horizontal beam angle, so that ranging edges of the side front and rear long-distance sensors are perpendicular to the travelling direction of the vehicle to avoid receiving ground echoes. Each sensor uses a vehicle gage sensor probe, and the tail end of the probe is flush with the body, which does not protrude out of the body exterior.

In operation S1, a driver confirms that within 20 meters in front of a vehicle to be parked, there is an available parking space in multiple diagonal parking spaces arranged along a reference line L0 in the same slope, which is used as a target diagonal parking space. In the present embodiment, the reference line L0 is a horizontal line. Specifically, as shown in FIG. 2, a target diagonal parking space A0 is located between a first reference parking space A1 and a second reference parking space A2, and the first reference parking space A1, the target diagonal parking space A0 and the second reference parking, space A2 are sequentially arranged from near to far according to the travel direction of the vehicle to be parked (from right to left in FIG. 2). It is to be understood that the slopes of these diagonal parking spaces are the same in the usual arrangement of the diagonal parking spaces.

Figure 3:
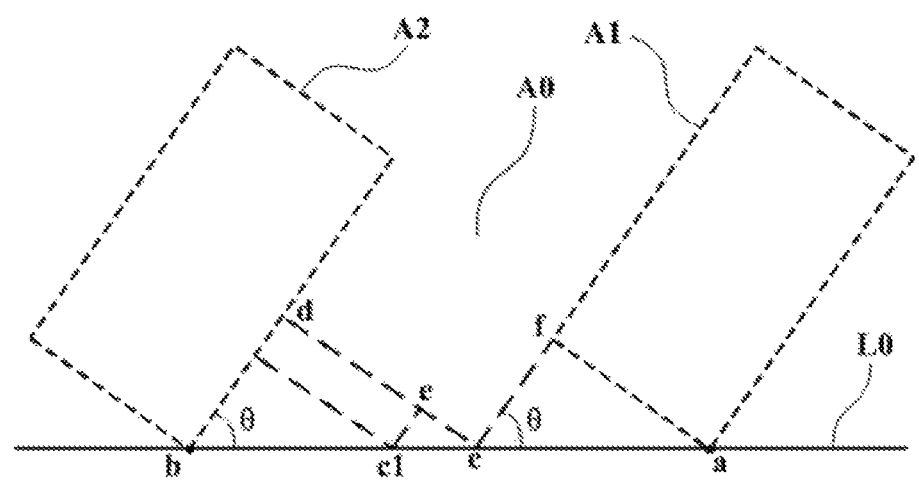
FIG. 3 is a schematic diagram of calculating the width of a diagonal parking space according to Embodiment 1 of the present disclosure.

It is to be noted that in the present embodiment, it is required to acquire ranging information of an ultrasonic sensor of the vehicle to be parked, that is, a body reflection echo of a preceding vehicle is collected, and the distance of sensor echoes is equal to a minimum distance from a transmitting point to a reflection point. Therefore, a first reference point a identifying an intersection point formed by the first reference parking space A1 and the reference line L0 and a second reference point b identifying an intersection, point formed by the second reference parking space A2 and the reference line L0 may be actually approximately replaced by points closest to the reference line L0 on reference vehicles respectively parked in the first reference parking space and the second reference parking space. For example, a point closest to the reference line L0 in the left front (also a reflection surface of the ultrasonic sensor) of the first reference vehicle parked in the first reference parking space A1 as shown in FIG. 2 may be taken as the first reference point a, and a point closest to the reference line L0 in the left front (also a reflection surface of the ultrasonic sensor) of the second reference vehicle parked in the second reference parking space A2 may be taken as the second reference point b. Of course, for some cases where markers (such as poles) are provided at the intersection point of the diagonal parking space and the reference line L0, these markers may also be used as the first reference point a or the second reference point b. It is to be understood that, an included angle (since the shape of the diagonal parking space is rectangular or approximately rectangular, the included angle is actually equivalent to an included angle between a long edge of the diagonal parking space and the reference line L0) between the diagonal parking space and the reference line L0 shown in FIG. 2 and FIG. 3 is an acute angle. Therefore, a point closest to the reference line L0 in the left front of the first reference vehicle parked in the first reference parking space A1 is taken as the first reference point a, and a point closest to the reference line L0 in the left front of the second reference vehicle parked in the second reference parking space A2 is taken as the second reference point b. If the included angle between the diagonal parking space and the reference line L0 is an obtuse angle, a point closest to the reference line L0 in the right front of the first reference vehicle parked in the first reference parking space A1 is taken as the first reference point a, and a point closest to the reference line L0 in the right front of the second reference vehicle parked in the second reference parking space A2 is taken as the second reference point b. Moreover, "front" herein refers to being closer to the vehicle to be parked, and is not specifically referring to the front of the vehicle body. For example, if the reference vehicle is parked toward the reference line L0 at the rear of the vehicle, the rear of the vehicle body of the reference vehicle is closer to the reference line L0.

The significance of detecting the first reference point a and the second reference point b in the present embodiment is that, on the one hand, the first reference point a is used as a starting point of the slope calculation of the target diagonal parking space, and on the other hand, after the slope is calculated, the width of the target diagonal parking space can be calculated in conjunction with the distance between the first reference point a and the second reference point b.

In operation S2, the first reference point a is detected by using a data feature extraction analysis method in the form of a window shift. Specifically, the vehicle to be parked is controlled to travel forward along the reference line L0 at a certain speed (i.e., from right to left as shown in FIG. 2), ultrasonic waves are received through the ultrasonic sensor r5 located in the side front of the vehicle to be parked, echoes are received to obtain multiple sensor ranging values of multiple reflection surfaces of the vehicle to be parked, the multiple sensor ranging values obtained within a travel distance (for example, 0.6 meters) of the vehicle to be parked are stored in a data buffer, the data buffer adopts a first-in first-out form to dynamically compensate the sensor ranging values, it is judged, within a certain time interval, whether data in the data buffer satisfies set conditions, and if so, a feature point is extracted as the first reference point a of the present embodiment.

The vehicle to be parked is controlled to travel forward (i.e., from right to left shown in FIG. 2) along the reference line L0 at a certain speed, an ultrasonic wave emitted by the ultrasonic sensor r5 in the side front of the vehicle is reflected on the first reference vehicle parked in the first reference parking space, that is, there are multiple reflection points on the first reference vehicle, and there is a sensor ranging value between each reflection point and the vehicle to be parked, so that within the set travel displacement of the vehicle to be parked, there will be multiple sensor ranging values corresponding to the respective reflection points from the vehicle to be parked to the first reference vehicle. These sensor ranging values are stored in a data buffer in a first-in and first-out manner. If these sensor ranging values are divided according to a certain time interval, multiple sets of sensor ranging, values corresponding to each time period can be obtained. For example, a set of sensor ranging values corresponding to one of the time periods is set to $X_0$, $X_1$, $X_2$, . . . , $X_m$. The specific manner of detecting the first reference point a in multiple reflection points on the first reference vehicle includes: correspondingly calculating a set of sensor ranging values within a certain time period to judge whether the calculated result simultaneously satisfies the following conditions.

First judgment condition: an average value of the set of sensor ranging values is calculated, and it is judged whether the average value is within a first threshold range, wherein in the present embodiment, the first threshold range is set to 0.5-2 meters.

Second judgment condition: a difference value between a maximum value and a minimum value in the set of sensor ranging values is calculated, and it is judged whether the difference value is within a second threshold range, wherein in the present embodiment, the second threshold range is set to 0.2-0.6 meters.

Third judgment condition: a third value reflecting symmetry of the set of sensor ranging values is calculated according to a following formula, and it is judged whether the third value is within a third threshold range, wherein the third threshold range is calibrated according to, an actual situation:

$$\sum_{i=0}^{m/2}(X_{m-i}-X_i)\times 2/m$$

where, as mentioned above, the set of sensor ranging values is first-in first-out in the data buffer and will be arranged in chronological order, $X_m$ is the last sensor ranging value in the set of sensor ranging values, $X_{m-1}$ is the penultimate sensor ranging value, i is a variable ranging from 0 to m/2, and $X_{m-i}-X_i$ represents a difference between sensor ranging values symmetrically located on both sides of a midpoint, the middle sensor ranging value in the set of sensor ranging values arranged above being taken as the midpoint. For example, the last sensor ranging value is subtracted from the first sensor ranging value, the penultimate sensor ranging value is subtracted from the second sensor ranging value, and so on.

Fourth judgment condition: a fourth value reflecting lower convexity of the set of sensor ranging values is calculated according to a following formula, and it is judged whether the fourth value is within a fourth threshold range, wherein the fourth threshold range is calibrated according to an actual situation:

$$\sum_{i=0}^{m/3} X_{\frac{m}{3}+i} - \left(\sum_{i=0}^{\frac{m}{3}} X_i + \sum_{i=0}^{\frac{m}{3}} X_{2\times\frac{m}{3}+i}\right)/2$$

where m is a subscript of the last sensor ranging value in the set of sensor ranging values, and i is a variable ranging from 0 to m/3.

If a set of sensor ranging values within a time period does not satisfy any of the above conditions, it is necessary to continue to judge a set of sensor ranging values in another time period. When a set of sensor ranging values within a set time period satisfies the above condition simultaneously, a reflection point corresponding to a middle sensor ranging value in the set of sensor ranging values is taken as the first reference point a.

After the first reference point a is detected in operation S2, operation S3 is performed to calculate the slope of the target diagonal parking space. It is to be understood that at this time, the ultrasonic sensor on the vehicle to be parked can receive the echo from the left body of the second reference vehicle parked in the second reference parking space, that is, there are multiple sensor ranging values between the vehicle to be parked and the second reference vehicle. As shown in FIG. 3, in one time, the change of the sensor ranging value between the vehicle to be parked and the second reference vehicle is the length of a line segment ce, and the moving distance of the vehicle to be parked is the length of cc1, so the calculation method of the inclination angle (i.e., the included angle between the length direction of the body of the second reference vehicle and the reference line L0, that is, the included angle between the target diagonal parking space and the reference line L0) is θ=arcsin(ce/cc1). However, the calculation method uses two line segments for slope calculation. In actual application, the measurement slope of the two line segments causes a large error. Therefore, the present embodiment is directed to many small line segments measured during the movement of the vehicle to be parked. These multiple measured data are estimated by a least squares method to obtain the slope of the target diagonal parking space.

Specifically, after detecting the first reference point a, the sensor ranging values of the data buffer are cleared and a new sensor ranging value is started to be stored (i.e., multiple sensor ranging values between the vehicle to be parked and the second reference vehicle). Specifically, when the sensor ranging value between the vehicle to be parked and the second reference vehicle is in the range of 4.5 meters to 2 meters, data storage is started, and assuming that the stored sensor ranging values are $x_1, x_2, \ldots, x_n$, the slope K of the target diagonal parking space is calculated as follows:

$$K = \frac{1}{C}\sum_{k=1}^{n}(x_k - \bar{x})(y_k - \bar{y})$$

$$\text{where, } C = \sum_{k=1}^{n}(x_k - \bar{x})^2$$

$x_k$ represents the travelling distance of the vehicle to be parked, $y_k$ is a sensor ranging value between the vehicle to be parked and the second reference vehicle, $\bar{x}$ and $\bar{y}$ respectively represent average values of $x_k$ and $y_k$, and k is a variable ranging from 1 to n.

A manner of detecting the second reference point b identifying the intersection point between the second reference parking space and the reference line L0 in operation S4 is similar to the detection manner of operation S2, except that the sensor ranging values are different. The sensor ranging value in operation S4 is the sensor ranging value between the vehicle to be parked and the left front of the second reference vehicle. The judgment manner is still to judge whether a set of sensor ranging values in each time period satisfies the above four judgment conditions simultaneously, when set of sensor ranging values in a certain time period is satisfied simultaneously, a reflection point corresponding to the middle sensor ranging value in the set of sensor ranging values is taken as the second reference point b.

It is also to be noted that the foregoing detection of the first reference point a and the second reference point b is performed by the ultrasonic sensor r5 in the side front of the vehicle to be parked, and the first reference point a and the second reference point b are also detected by the side rear ultrasonic sensor r6 in the present embodiment, which is equivalent to further checking the points a and b, thereby reducing the position error.

Finally, the width of the target diagonal parking space is calculated in operation S5. As shown in FIG. 3, since the first reference point a and the second reference point b have been detected at this time, the length of a line segment ab is obtained by subtracting the given coordinates, a line segment af is the width of the first reference parking space, according to the slope of the target diagonal parking space calculated in operation S3, the included angle between the target diagonal parking space and the reference line (i.e., the inclination angle of the target diagonal parking space) can be obtained, and therefore, the width of the target diagonal parking space is Cd=ab×sin θ−af. In order to simplify the operation, af may be a reference value, for example, 2 meters.

The detection method of the present embodiment can detect the diagonal parking spaces with different inclination angles, and is especially more accurate and effective for the inclination angle between 30-60 degrees, so that the ultrasonic sensor can be fixedly mounted without the need of rotatable mounting due to the transformation of the inclination angle of the diagonal parking space, thereby saving cost and man-hours.

According to the detection method of the first embodiment of the present disclosure, the width and inclination degree of the target diagonal parking space can be calculated, the coordinate position of the target diagonal parking space can also be obtained according to the first reference point a and the second reference point b in a given coordinate system, and this information is very important for the parking route planning of the diagonal parking space.

Figure 4:
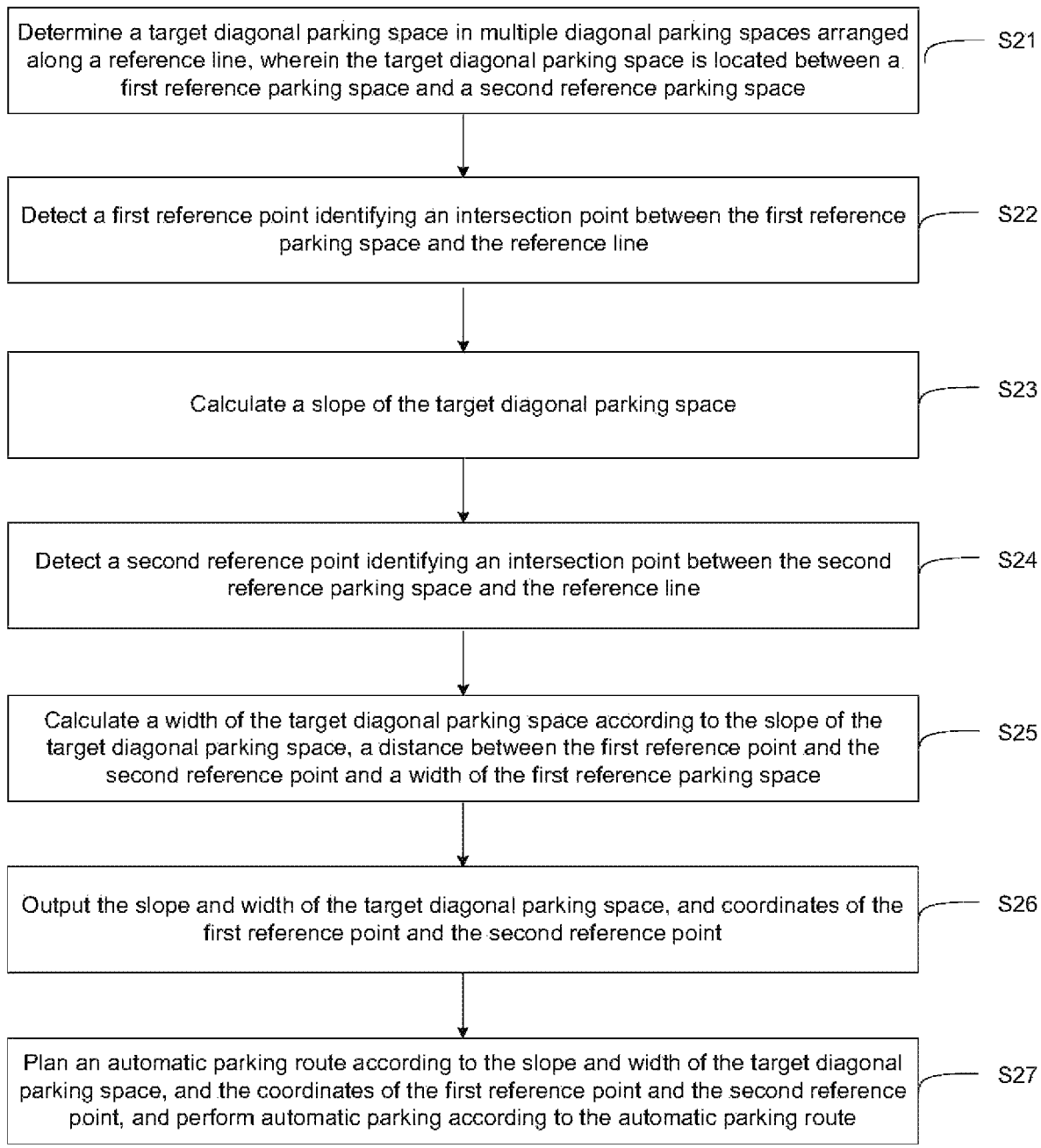
FIG. 4 is a flowchart of an automatic parking method according to Embodiment 2 of the present disclosure.

Therefore, as shown in FIG. 4, a second embodiment of the present disclosure provides an automatic parking method, which includes the operations as follows.

In operation S21, a target diagonal parking space is determined in multiple diagonal parking spaces arranged along a reference line, wherein the target diagonal parking space is located between a first reference parking space and a second reference parking space.

In operation S22, a first reference point identifying an intersection point between the first reference parking space and the reference line is detected.

In operation S23, a slope of the target diagonal parking space is calculated.

In operation S24, a second reference point identifying an intersection point between the second reference parking space and the reference line is detected.

In operation S25, a width of the target diagonal parking space is calculated according to the slope of the target diagonal parking space, a distance between the first reference point and the second reference point and a width of the first reference parking space.

In operation S26, the slope and width of the target diagonal parking space, and coordinates of the first reference point and the second reference point are output.

In operation S27, an automatic parking route is planned according to the slope and width of the target diagonal parking space, and the coordinates of the first reference point and the second reference point, and automatic parking is performed according to the automatic parking route.

Correspondingly, a third embodiment of the present disclosure provides an automatic parking system, which includes: a diagonal parking space detection device and an automatic parking control device.

The diagonal parking space detection device further includes: a determination unit, a detection unit and a calculation unit.

The determination unit is configured to determine a target diagonal parking space in multiple diagonal parking spaces arranged along a reference line, wherein the target diagonal parking space is located between a first reference parking space and a second reference parking space.

The detection unit is configured to detect a first reference point identifying an intersection point between the first reference parking space and the reference line and detect a second reference point identifying an intersection point between the second reference parking space and the reference line.

The calculation unit is configured to calculate a slope of the target diagonal parking space and calculate a width of the target diagonal parking space according to the slope of the target diagonal parking space, a distance between the first reference point and the second reference point and a width of the first reference parking space.

The automatic parking control device is configured to plan an automatic parking route according to the slope and width of the target diagonal parking space, and the coordinates of the first reference point and the second reference point, and perform automatic parking according to the automatic parking route.

The working principle and the corresponding technical effects of the foregoing embodiments refer to the description of the first embodiment of the present disclosure, and details are not described herein again.

The above is a further detailed description of the present disclosure in connection with the specific preferred embodiments, and the specific embodiments of the present disclosure are not limited to the description. A number of simple derivations or replacements may be made by those of ordinary skill in the art without departing from the conception of the present disclosure, and all fall within the scope of protection of the present disclosure.

What is claimed is:

1. A diagonal parking space detection method, comprising:
    operation S11, determining a target diagonal parking space in a plurality of diagonal parking spaces arranged along a reference line, wherein the target diagonal parking space is located between a first reference parking space and a second reference parking space;
    operation S12, detecting a first reference point identifying an intersection point between the first reference parking space and the reference line;
    operation S13, calculating a slope of the target diagonal parking space, wherein the operation S13 comprises: controlling a to-be-parked vehicle to travel a set distance along the reference line toward the target diagonal parking space, and acquiring a plurality of sensor ranging values between the to-be-parked vehicle and a second reference vehicle parked in the second reference parking space; and estimating the slope of the target diagonal parking space by a least squares method according to a travelling distance of the to-be-parked vehicle and the plurality of sensor ranging value;
    operation S14, detecting a second reference point identifying an intersection point between the second reference parking space and the reference line; and
    operation S15, calculating a width of the target diagonal parking space according to the slope of the target diagonal parking space, a distance between the first reference point and the second reference point and a width of the first reference parking space.

2. The detection method as claimed in claim 1, wherein the first reference parking space, the target diagonal parking space and the second reference parking space are arranged along the reference line in the same slope in an ascending order of their respective distance from the to-be-parked vehicle.

3. The detection method as claimed in claim 2, wherein the first reference point is located on a first reference vehicle parked in the first reference parking space, and the second reference point is located on a second reference vehicle parked in the second reference parking space.

4. The detection method as claimed in claim 3, wherein the operation S12 comprises:
    controlling the to-be-parked vehicle to travel a set distance along the reference line toward the target diagonal parking space, and obtaining a plurality of sensor ranging values between the to-be-parked vehicle and a plurality of reflection points on the first reference vehicle; and
    judging whether a set of sensor ranging values within a set time period satisfies a set judgment condition, and when judging that the set of sensor ranging values within the set time period satisfies the set judgment condition, taking a reflection point corresponding to a middle sensor ranging value in the set of sensor ranging values as the first reference point.

5. The detection method as claimed in claim 4, wherein the operation S14 comprises:
    controlling the to-be-parked vehicle to travel a set distance along the reference line toward the target diagonal parking space, and obtaining a plurality of sensor ranging values between the to-be-parked vehicle and a plurality of reflection points on the second reference vehicle; and
    judging whether a set of sensor ranging values within a set time period satisfies a set judgment condition, and when judging that the set of sensor ranging values within the set time period satisfies the set judgment condition, taking a reflection point corresponding to a middle sensor ranging value in the set of sensor ranging values as the second reference point.

6. The detection method as claimed in claim 5, wherein judging whether the set of sensor ranging values within the set time period satisfies the set judgment condition comprises: judging whether the set of sensor ranging values simultaneously satisfies the following set judgment conditions:
    calculating an average value of the set of sensor ranging values, and judging whether the average value is within a first threshold range;
    calculating a difference between a maximum value and a minimum value in the set of sensor ranging values, and judging whether the difference is within a second threshold range;
    calculating a third value reflecting symmetry of the set of sensor ranging values according to a following formula and judging whether the third value is within a third threshold range:

$$\sum_{i=0}^{m/2}(X_{m-i}-X_i)\times 2/m$$

where m is a subscript of the last sensor ranging value in the set of sensor ranging values, i is a variable ranging from 0 to m/2, and $X_{m-i}-X_i$ represents a difference between sensor ranging values symmetrically located on both sides of a midpoint, the middle sensor ranging value in the set of sensor ranging values being taken as the midpoint; and
    calculating a fourth value reflecting lower convexity of the set of sensor ranging values according to a following formula and judging whether the fourth value is within a fourth threshold range:

$$\sum_{i=0}^{m/3} X_{\frac{m}{3}+i} - \left(\sum_{i=0}^{\frac{m}{3}} X_i + \sum_{i=0}^{\frac{m}{3}} X_{2\times\frac{m}{3}+i}\right)/2$$

where m is a subscript of the last sensor ranging value in the set of sensor ranging values, and i is a variable ranging from 0 to m/3.

7. The detection method as claimed in claim 6, wherein the first threshold range is set to 0.5-2 meters, the second threshold range is set to 0.2-0.6 meters, and the third threshold range and the fourth threshold range are calibrated according to actual situations.

8. The detection method as claimed in claim 1, wherein the slope of the target diagonal parking space is estimated according to a following formula:

$$K = \frac{1}{C}\sum_{k=1}^{n}(x_k - \bar{x})(y_k - \bar{y})$$

$$\text{where } C = \sum_{k=1}^{n}(x_k - \bar{x})^2$$

K is the slope of the target diagonal parking space, $x_k$ represents the travelling distance of the to-be-parked vehicle, $y_k$ is a sensor ranging value between the to-be-parked vehicle and the second reference vehicle, $\bar{x}$ and $\bar{y}$ respectively represent average values of $x_k$ and $y_k$, and k is a variable ranging from 1 to n.

9. The detection method as claimed in claim 1, wherein the operation S15 comprises:
obtaining an included angle between the target diagonal parking space and the reference line according to the slope of the target diagonal parking space; and
obtaining the width of the target diagonal parking space by subtracting the width of the first reference parking space from a product of the distance between the first reference point and the second reference point and a sine value of the included angle.

10. An automatic parking method, comprising:
operation S21, determining a target diagonal parking space in a plurality of diagonal parking spaces arranged along a reference line, wherein the target diagonal parking space is located between a first reference parking space and a second reference parking space;
operation S22, detecting a first reference point identifying an intersection point between the first reference parking space and the reference line;
operation S23, calculating a slope of the target diagonal parking space, wherein the operation S23 comprises: controlling a to-be-parked vehicle to travel a set distance along the reference line toward the target diagonal parking space, and acquiring a plurality of sensor ranging values between the to-be-parked vehicle and a second reference vehicle parked in the second reference parking space; and estimating the slope of the target diagonal parking space by a least squares method according to a travelling distance of the to-be-parked vehicle and the plurality of sensor ranging value;
operation S24, detecting a second reference point identifying an intersection point between the second reference parking space and the reference line;
operation S25, calculating a width of the target diagonal parking space according to the slope of the target diagonal parking space, a distance between the first reference point and the second reference point and a width of the first reference parking space;
operation S26, outputting the slope and width of the target diagonal parking space, and coordinates of the first reference point and the second reference point; and
operation S27, planning an automatic parking route according to the slope and width of the target diagonal parking space, and the coordinates of the first reference point and the second reference point, and performing automatic parking according to the automatic parking route.

11. An automatic parking system, comprising:
a diagonal parking space detection device comprising:
a determination unit, configured to determine a target diagonal parking space in a plurality of diagonal parking spaces arranged along a reference line, wherein the target diagonal parking space is located between a first reference parking space and a second reference parking space;
a detection unit, configured to detect a first reference point identifying an intersection point between the first reference parking space and the reference line and detect a second reference point identifying an intersection point between the second reference parking space and the reference line;
a calculation unit, configured to calculate a slope of the target diagonal parking space and calculate a width of the target diagonal parking space according to the slope of the target diagonal parking space, a distance between the first reference point and the second reference point and a width of the first reference parking space, wherein the calculation unit is configured to calculate the slope of the target diagonal parking space in a following manner: controlling a to-be-parked vehicle to travel a set distance along the reference line toward the target diagonal parking space, and acquiring a plurality of sensor ranging values between the to-be-parked vehicle and a second reference vehicle parked in the second reference parking space; and estimating the slope of the target diagonal parking space by a least squares method according to a travelling distance of the to-be-parked vehicle and the plurality of sensor ranging value; and
an automatic parking control device, configured to plan an automatic parking route according to the slope and width of the target diagonal parking space, and the coordinates of the first reference point and the second reference point, and perform automatic parking according to the automatic parking route.

12. The automatic parking method as claimed in claim 10, wherein the first reference parking space, the target diagonal parking space and the second reference parking space are arranged along the reference line in the same slope in an ascending order of their respective distance from the to-be-parked vehicle.

13. The automatic parking method as claimed in claim 10, wherein the operation S25 comprises:
obtaining an included angle between the target diagonal parking space and the reference line according to the slope of the target diagonal parking space; and
obtaining the width of the target diagonal parking space by subtracting the width of the first reference parking space from a product of the distance between the first reference point and the second reference point and a sine value of the included angle.

14. The automatic parking method as claimed in claim 13, wherein the first reference point is located on a first reference vehicle parked in the first reference parking space, and the second reference point is located on a second reference vehicle parked in the second reference parking space.

15. The automatic parking method as claimed in claim 14, wherein the operation S22 comprises:
controlling the to-be-parked vehicle to travel a set distance along the reference line toward the target diagonal parking space, and obtaining a plurality of sensor ranging values between the to-be-parked vehicle and a plurality of reflection points on the first reference vehicle; and
judging whether a set of sensor ranging values within a set time period satisfies a set judgment condition, and when judging that the set of sensor ranging values within the set time period satisfies the set judgment condition, taking a reflection point corresponding to a middle sensor ranging value in the set of sensor ranging values as the first reference point.

16. The automatic parking method as claimed in claim 15, wherein the operation S24 comprises:

controlling the to-be-parked vehicle to travel a set distance along the reference line toward the target diagonal parking space, and obtaining a plurality of sensor ranging values between the to-be-parked vehicle and a plurality of reflection points on the second reference vehicle; and judging whether a set of sensor ranging values within a set time period satisfies a set judgment condition, and when judging that the set of sensor ranging values within the set time period satisfies the set judgment condition, taking a reflection point corresponding to a middle sensor ranging value in the set of sensor ranging values as the second reference point.

17. The automatic parking method as claimed in claim 16, wherein judging whether the set of sensor ranging values within the set time period satisfies the set judgment condition comprises: judging whether the set of sensor ranging values simultaneously satisfies the following set judgment conditions:

calculating an average value of the set of sensor ranging values, and judging whether the average value is within a first threshold range;

calculating a difference between a maximum value and a minimum value in the set of sensor ranging values, and judging whether the difference is within a second threshold range;

calculating a third value reflecting symmetry of the set of sensor ranging values according to a following formula and judging whether the third value is within a third threshold range:

$$\sum_{i=0}^{m/2}(X_{m-i}-X_i)\times 2/m$$

where m is a subscript of the last sensor ranging value in the set of sensor ranging values, i is a variable ranging from 0 to m/2, and $X_{m-i}-X_i$ represents a difference between sensor ranging values symmetrically located on both sides of a midpoint, the middle sensor ranging value in the set of sensor ranging values being taken as the midpoint; and calculating a fourth value reflecting lower convexity of the set of sensor ranging values according to a following formula and judging whether the fourth value is within a fourth threshold range:

$$\sum_{i=0}^{m/3} X_{\frac{m}{3}+i} - \left(\sum_{i=0}^{\frac{m}{3}} X_i + \sum_{i=0}^{\frac{m}{3}} X_{2\times\frac{m}{3}+i}\right)/2$$

where m is a subscript of the last sensor ranging value in the set of sensor ranging values, and i is a variable ranging from 0 to m/3.

18. The automatic parking system as claimed in claim 11, wherein the first reference parking space, the target diagonal parking space and the second reference parking space are arranged along the reference line in the same slope in an ascending order of their respective distance from the to-be-parked vehicle.

19. The automatic parking system as claimed in claim 11, wherein the calculation unit is configured to:

obtain an included angle between the target diagonal parking space and the reference line according to the slope of the target diagonal parking space; and obtain the width of the target diagonal parking space by subtracting the width of the first reference parking space from a product of the distance between the first reference point and the second reference point and a sine value of the included angle.

* * * * *